United States Patent
Stearns et al.

(10) Patent No.: US 6,714,677 B1
(45) Date of Patent: Mar. 30, 2004

(54) USE OF CORRELATION HISTOGRAMS FOR IMPROVED GLYPH DECODING

(75) Inventors: Richard G. Stearns, Santa Cruz, CA (US); W. Glen Petrie, Los Gatos, CA (US); L. Noah Flores, Woodside, CA (US); David L. Hecht, Palo Alto, CA (US); David A. Jared, Sunnyvale, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/466,015

(22) Filed: Dec. 17, 1999

(51) Int. Cl.⁷ ................................................. G06K 9/00
(52) U.S. Cl. ........................ 382/181; 235/494; 382/310
(58) Field of Search ................................. 382/181, 100, 382/159, 310, 187, 161, 112, 155, 157, 228, 203, 204, 205, 206, 207, 182, 183; 235/495, 494, 456, 487

(56) References Cited

U.S. PATENT DOCUMENTS

| | | | |
|---|---|---|---|
| 5,168,147 A | * 12/1992 | Bloomberg | 235/456 |
| 5,221,833 A | * 6/1993 | Hecht | 235/494 |
| 5,245,165 A | 9/1993 | Zhang | |
| 5,449,895 A | * 9/1995 | Hecht et al. | 235/494 |
| 5,449,896 A | * 9/1995 | Hecht et al. | 235/494 |
| 5,453,605 A | * 9/1995 | Hecht et al. | 235/494 |
| 5,521,372 A | * 5/1996 | Hecht et al. | 235/494 |
| 5,572,010 A | * 11/1996 | Petrie | 235/494 |
| 5,576,532 A | * 11/1996 | Hecht | 235/494 |
| 6,256,398 B1 | * 7/2001 | Chang | 382/100 |
| 6,470,096 B2 | * 10/2002 | Davies et al. | 382/203 |

FOREIGN PATENT DOCUMENTS

| | | |
|---|---|---|
| WO | WO 00/73981 A1 | 12/2000 |
| WO | WO 01/01670 A1 | 1/2001 |

OTHER PUBLICATIONS

Goldstein et al., "Using Aggregation and Dynamic Queries for Exploring Large Data Sets," Human Factors in Computing Systems, 23–29 (1994).

Hecht, "Embeded Data Glyph Technology for Hardcopy Digital Documents," Proceedings Reprint, 2171:341–352 (1994).

* cited by examiner

Primary Examiner—Jayanti K. Patel
Assistant Examiner—Seyed Azarian

(57) ABSTRACT

A method of decoding a plurality of glyphs comprising the steps of scanning a group of glyphs to form image data for expected glyph locations, assigning for each location a first value indicative of the likelihood that location contains a glyph in a first state, assigning for each location a second value indicative of the likelihood that location contains a glyph in a second state, determining the difference between the first and second values for each potential glyph location, establishing a distribution analysis of the determined differences and using that distribution analysis at least in part to control decoding of the plurality of glyphs.

15 Claims, 2 Drawing Sheets

USE OF CORRELATION HISTOGRAMS FOR IMPROVED GLYPH DECODING

BACKGROUND OF THE INVENTION

I. Field of the Invention

This invention relates to self-clocking glyph codes for recording digital information on graphic recording media, such as plain paper. Even more specifically, this invention pertains to techniques for increasing the reliability of decoding that digital information.

II. Background of the Invention

In the most common form of glyph decoding used at present, individual slash-like glyphs are read by performing cross-correlations with two correlation kernels representing two possible states of the glyphs. These states may, for example, be indicated by +45 or −45 degrees of slash rotation. As a region of glyphs is decoded, a two-dimensional matrix is filled. Each element of this matrix corresponds to a determined orientation of a glyph. Logic values (typically "0" and "1") correspond in a physically direct manner to the glyph image, that is to say to the array of glyphs which are scanned to produce the data. Thus, the matrix of logic values is a direct representation of the orientation information carried by the glyphs. Decoding glyphs by means of correlations is described in U.S. Pat. No. 5,128,525, entitled "Convolutional Filtering for Decoding Self-Clocking Glyph Shape Codes," which is assigned to the assignee of the present application and is hereby expressly incorporated by reference.

In decoding each individual glyph, cross-correlations of a glyph image in a local region, where each glyph is expected to be, is undertaken with two correlation kernels. The maximum correlation with each kernel is noted. Typically, if the difference between the two maximum correlations is larger than some preset threshold value (a correlation threshold), the glyph is assumed to be present and the value assigned to the glyph is associated with the orientation of the kernel that produced the maximum correlation value.

If the difference between the two maximum correlation values over the region of interest is smaller than the correlation threshold, then an erasure value is reported. This indicates generally that it was not possible to determine the value of the glyph in the image area under consideration.

The correlation threshold thus reflects a compromise in the ability to distinguish the orientation of the glyph in the presence of background image noise or image degradation. Setting the correlation value very high would generally mean that detected glyphs are unlikely to be decoded in error. However, many glyphs will not be unambiguously decoded, but instead will be recorded as erasures. A low correlation threshold conversely will result in more glyphs being decoded, but with greater likelihood of incorrect categorization. It is expected that an optimum value of the correlation threshold may vary depending upon the nature of the glyph image, including the condition of its printing and the condition of the scanning process undertaken.

The present invention is directed toward improving the selection of a threshold so as to maximize correct categorization while minimizing the number of glyphs erroneously decoded.

SUMMARY OF THE INVENTION

Consistent with the principles of the present invention, a method of decoding a plurality of glyphs is provided comprising the steps of: capturing an image of a group of glyphs to form image data for each glyph location; assigning for each location a first value indicative of the likelihood that location contains a glyph in a first state; assigning for each location a second value indicative of the likelihood that location contains a glyph in a second state; determining the difference between the first and second values for each potential glyph location; and decoding the plurality of glyphs based at least in part upon a distribution analysis of the determined differences. More specifically, the step of assigning preferably includes performing cross-correlations for each location with first and second correlation kernels representing the first and second states of the glyphs. In this case the step of decoding preferably includes establishing a threshold value for the minimum determined difference indicative of unambiguous decoding of a glyph state.

In another aspect of the invention, the determined difference values for each location are stored in memory and compared afterwards with the threshold to decode the image data for those locations, without the necessity to rescan those locations. In another aspect of the present invention, a distribution analysis of the determined differences in the form of a histogram is used to establish an optimum threshold value.

BRIEF DESCRIPTION OF THE DRAWINGS

Still further features and advantages of this invention will become apparent when the following detailed description is read in conjunction with the attached drawings in which.

DETAILED DESCRIPTION OF THE EMBODIMENT

While the invention is disclosed in some detail below with specific reference to certain illustrated embodiments, it is to be understood that there is no intent to limit the invention to a particular embodiment. On the contrary, the goal is to cover all modifications, alternatives and equivalents that fall within the spirit and scope of the invention as defined by the appended claims.

By gathering statistics on the correlation values of enough glyphs, for example 200 or 300, it has been determined that one may, in-situ, determine an optimal correlation threshold for a given image. That is, at the time of decoding a glyph image, use may be made of the statistics of cross-correlations performed by decoding the image to optimize that decoding. In a system using an error correction code, such as the Reed-Solomon error correction code, the threshold could be set in conjunction with the amount of erasures errors (i.e, not able to determine a one or a zero) that the error correction code can handle. Specifically, the integral of the correlation histogram would give the cumulative occurrence of erasures below a specified correlation value. The correlation threshold could then be set at a value that would minimize errors (miscorrections) but would still be able to correct the cumulative erasures as calculated from the correlation histogram.

A particular useful quantity to study is the difference between the two maximum correlation values over each region where a glyph is expected to be located. This difference may be referred to as the correlation difference for each respective glyph. By constructing a histogram of this quantity over a few hundred glyphs, valuable information may be obtained. For example, in FIG. 1 there are shown histograms of the correlation differences from three images taken of the same printed glyph patch. The images were captured using a two-dimensional CCD camera, and the three images correspond to different levels of defocus. Curve (a) is a histogram of the correlation difference for an image in focus of the type shown in FIG. 2a. Curve (b) of FIG.1 corresponds with slightly defocussed version of the same glyph pattern as is, for example, shown in FIG. 2b. Curve (c) in FIG. 1 shows the correlation difference of a histogram for a strongly defocussed image of the same glyph pattern, for example, as shown in FIG. 2c.

Figure 1:
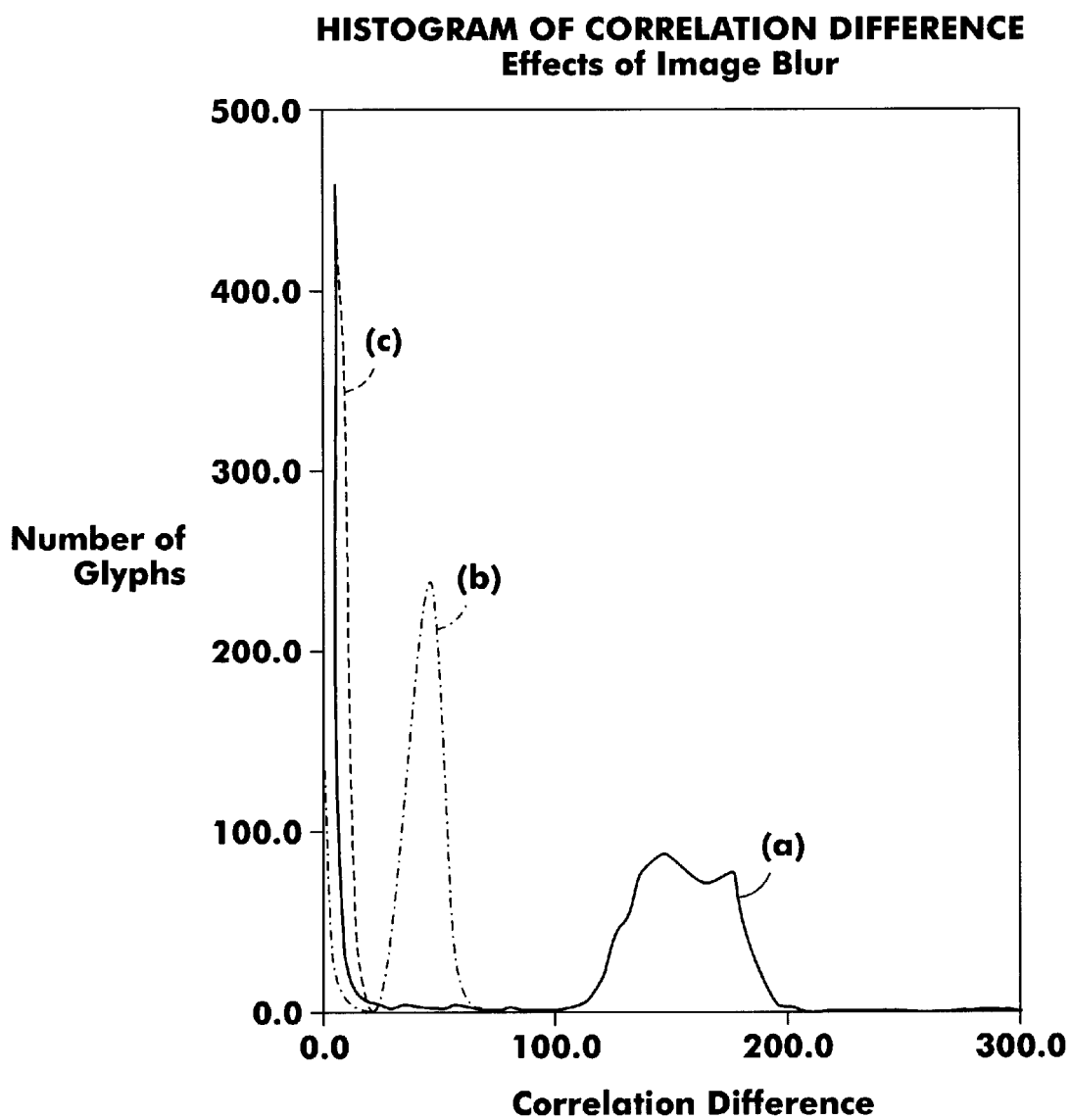
FIG. 1 comprises histograms of the correlation differences of scanned glyphs of different quality images.
Figure 2A:
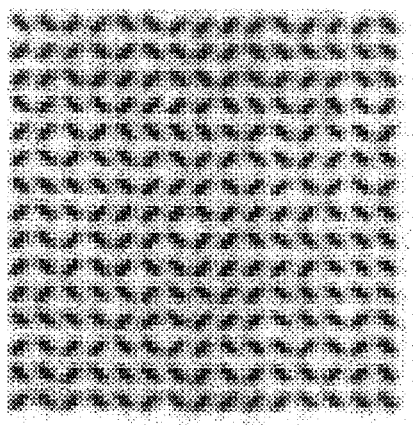
FIG. 2 shows the image 2(a, b, c) from which the histograms of FIG. 1 were constructed.
Figure 2B:
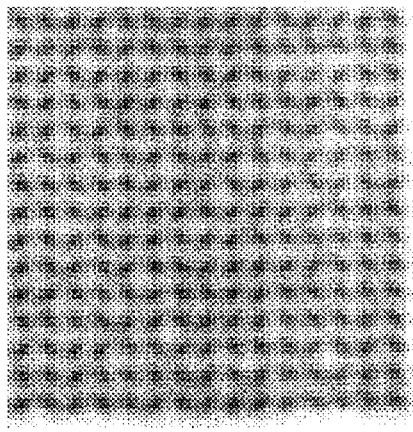
Figure 2C:
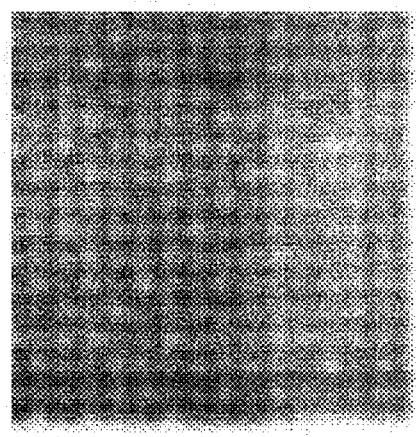

From the curves of FIG. 1, it is apparent that as the image degrades with defocus, the peak of the corresponding correlation histogram moves leftward toward smaller values of correlation difference. For example, while in FIG. 1 there are a significant number of glyphs for curve (a) having a correlation difference between slightly more than 100 and slightly less than 200, as the image degrades, the resultant histogram of curve (b) has a meaningful number of glyphs residing in a much smaller range of correlation difference, on the order of magnitude of 30 to 50. Thus, the peak of the correlation histogram has moved leftwards. This is to be expected, since the image degradation results in less discrimination between the two glyphs orientations and, hence, smaller differences exist between the resultant image and the corresponding orientation kernels.

In general, the histograms illustrated in FIG. 1 have a minimum between their correlation peak and their value at a correlation difference of zero. This is because there will, in general, be some amount of decoding that yields near zero correlation difference corresponding to regions of the image that do not contain glyphs, but are examined by the decoder. Such regions include, for example, the border area around a block of glyphs. Ideally, one would like to place the correlation threshold in this minimum between zero and the peak correlation value. In the curves of FIG. 1, this can easily be accomplished for curves (a) and (b). However, for curve (c), the image quality has been so greatly degraded that the peak of correlation difference occurs at a value of zero and no minimum exists. In practice, one might still be able to successfully decode the glyph image of curve (c) if the correlation threshold is set low enough and there is enough error correction employed. A decoder using this histogram information could adaptively set the threshold very low. In addition, such a decoder could return a message to the user signaling that the glyph image is severely corrupted. With additional analysis of the histogram the decoder might be able to identify the cause of the degradation; for example, image blur, low image contrast, exposure level, or sampling resolution.

In a system with automatic feedback, it may be possible for the system to keep itself optimally tuned using the histogram information. In general, any image degradation will cause a leftward shift of the correlation difference peak to lower values of correlation difference. It has been found experimentally that the correlation difference peak shifts well before there is significant degradation in the decoder performance itself. In other words, there is correlation difference peak shift before any increase in decoding error rate occurs. Thus, histogram information allows the performance of a glyph printing and capture system to be evaluated, even allowing for the possibility of active feedback without effecting the decoding performance. As a specific example, if a printer used to render the glyphs exhibited a degradation in print contrast, the histogram information could be used to alert the user or the printer using computer-controlled feedback. The alert could indicate print quality was degrading, thus allowing the degradation to be corrected before there is any impact on the final glyph decoding error rate. As a second example, the histogram information could be used as feedback to adjust focus of an image capture device, such as a camera.

Curves similar to those shown in FIG. 1 have been generated for changes in image exposure and modification with similar behavior in distribution. It is expected that this behavior of distribution of the correlation difference histogram on image degradation would be quite general.

Finally, it may be possible to construct a glyph pattern such that the correlation histogram has a specific signature. In this case, measurement of the correlation histogram could be used as an authentication method to determine whether the glyphs have been copied or otherwise tampered with.

In one embodiment, the correlations required to generate the histogram are gathered as a separate step in the decoder. That is, the decoder operates in its normal manner, but does not discriminate the type of glyph present when performing correlations. After looking at several hundred glyphs, a histogram is constructed and the decoder chooses an optimal correlation threshold, or perhaps returns a message to the user that the glyph image is not decodable. The decoder then begins anew decoding the glyph patch. This approach results in some loss of overall decoding speed, since the time spent in creating the histogram correlation data is not used directly in the decoding.

In another embodiment, the histogram generation is integrated with the decoding operation. In this embodiment, as the first several hundred correlations are performed, the correlation differences are stored in memory along with the corresponding glyph positions. After creating the histogram and calculating the optimum correlation threshold, these previous correlations are used directly by comparing their value to the threshold value, thereby determining the glyph orientation at each position stored in memory. This approach minimizes the impact on the overall decoding speeds since correlations used to create the histogram do not need to be recalculated to determine the correlation glyph values. All that is necessary is to store the correlation differences and an indication of the kernel with the maximum value for each of the glyph locations.

It should be understood that this methodology could be applied to any form of glyph or glyph pattern. For example, this methodology is applicable to the many forms of glyph codes and glyph patterns illustrated in U.S. Pat. Nos. 5,168,147 and 5,453,605, assigned to the assignee of the present application. U.S. Pat. Nos. 5,168,147 and 5,453,605 are hereby expressly incorporated by reference.

The foregoing description of the invention has been presented for purposes of illustration and description. It is not exhaustive and does not limit the invention to the precise form disclosed. Modifications and variations are possible in light of the above teachings or may be acquired from practicing of the invention.

What is claimed:

1. A method of decoding a plurality of glyphs comprising the steps of:

capturing an image of a group of said glyphs to form image data for expected glyph locations;

for at least a portion of the image data indicating a subset of expected glyph locations:

assigning, for each location in the subset, a first value indicative of the likelihood that location contains a glyph in a first state;

assigning, for each location in the subset, a second value indicative of the likelihood that location contains a glyph in a second state;

determining a difference value indicating a difference between said first and second values for each expected glyph location;

producing a distribution analysis of counts of expected glyph locations for each difference value; and setting a decoding threshold based on said distribution analysis, and decoding the plurality of glyphs using the decoding threshold.

2. A method of claim 1 wherein said steps of assigning each include performing cross-correlations of said image data for each location, with first and second correlation kernels representing said first and second states, respectively.

3. A method of claim 1 wherein the decoding threshold is set to indicate a threshold value for the minimum determined difference indicative of unambiguous encoding of a glyph state.

4. A method of claim 1 wherein said distribution analysis includes: developing a histogram of said counts of expected glyph locations for each difference value.

5. A method of claim 1, further including:

providing information to a printer system based on said distribution analysis for controlling print quality.

6. A method of claim 1, wherein the decoding threshold is set to indicate an optimal correlation threshold based on an amount of erasures.

7. A method of claim 1, further including:

providing information to a printer system based on said distribution analysis for controlling glyph image print quality.

8. A method of claim 1, further including:

providing information to a camera system based on said distribution analysis for controlling glyph image quality.

9. A method of claim 1, further including:

providing information to a system based on said distribution analysis for providing an alert that the glyph image has degraded in quality and adjustments to the system need to be made.

10. A method of claim 1 wherein the decoding threshold is set to indicate an optimal correlation threshold based on an amount of erasures and an erasure/error correction capacity of a glyph error correction code.

11. A method of claim 1, further including:

providing information based on said distribution analysis to an image capture device to adjust image capture quality.

12. A method of claim 1, further including:

providing information based on said distribution analysis to an image capture device to adjust glyph image capture quality.

13. A method of claim 1 wherein said decoding threshold is set based on said distribution analysis prior to beginning the step of decoding the plurality of glyphs.

14. A method of claim 1 wherein the decoding threshold is set to an initial threshold when the step of decoding the plurality of glyphs begins; and wherein the decoding threshold is set based on said distribution analysis during the decoding step.

15. In a method for decoding a bitmap image space representation of a self-clocking glyph shape code composed of glyphs having shapes that encode digital values, the glyphs being spatially distributed in locations in the bitmap image space in substantial accordance with a spatial formatting rule, the decoding method including a filtering step for filtering the bitmap image space representation of glyphs using a plurality of correlation filters, each correlation filter being relatively strongly matched to one of the shapes, a digital value being assigned to a glyph shape based on glyph-by-glyph evaluation of correlation values produced by the filtering step when a correlation value exceeds a correlation threshold, the improvement comprising:

determining a correlation difference value indicating a difference between first and second correlation values for each glyph location during the glyph-by-glyph evaluation of correlation values produced by the filtering step;

producing a distribution analysis of counts of expected glyph locations for each correlation difference value; and setting the correlation threshold based on said distribution analysis.

* * * * *